United States Patent Office 3,226,881
Patented Jan. 4, 1966

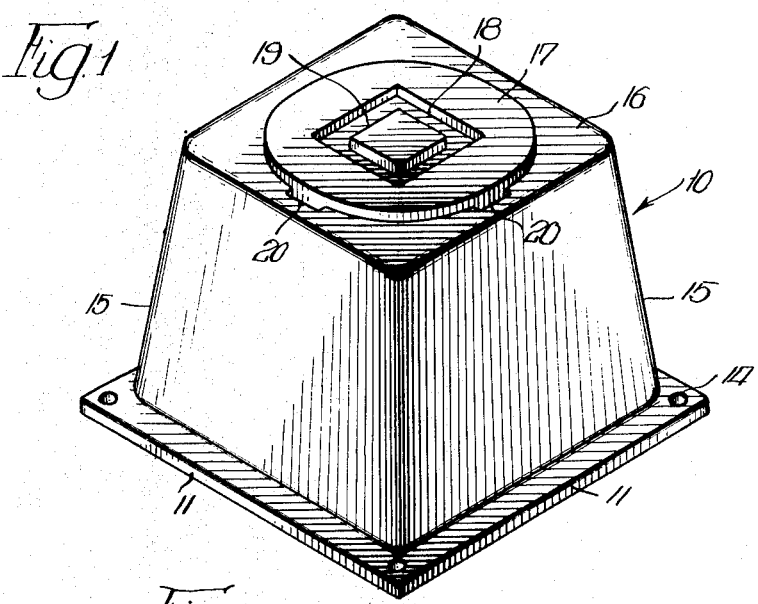
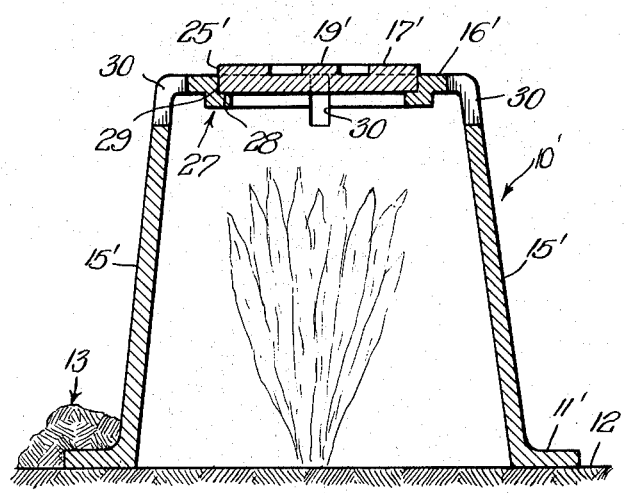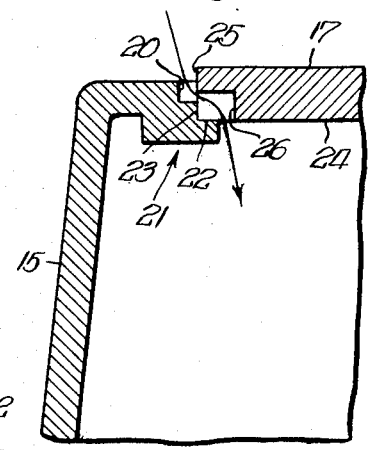

3,226,881
PLANT PROTECTION DEVICE
Earl V. Garrett, 833 Euclid, Elmhurst, Ill.
Filed Feb. 3, 1964, Ser. No. 342,108
1 Claim. (Cl. 47—30)

My invention relates to a device which can be readily used for the protection of outdoor plants during the cold months of the year.

As is well known, certain provisions must be taken to protect various types of outdoor plants, such as rosebushes, chrysanthemums, lilies, and other, during the cold season of the year, particularly in the northern sections of the United States. The problem of protection for the plants would be simplified if the temperatures were uniformly cold. If such were the case, then the plants would remain in the dormant stage during the entire cold season and would commence their growth during the warming trend of the spring. Unfortunately, such is not the case as even in the coldest sections of the country there are periods of unseasonable warmth and sunning days during the winter months, and also in the late fall and early spring seasons it can be expected that daytime temperatures will be fairly high while the nighttime temperatures can easily fall to fairly low temperatures. Thus, it is apparent that the plants can be exposed to many extremes of high and low temperatures during the period of the late fall season, the winter months, and the early springtime months.

The extremes in temperature can be very harmful to the outdoor plant. During the warmer periods or on bright days when the sun's rays can warm the stems of the plant and the earth around the plant, there will be a general thawing condition in the stems of the plant and in the earth. On the other hand, during the colder periods and during the time when the sun's rays are not directed on the plant area, it can be expected that the stems of the plant and the area of the earth around the plant will be in a frozen condition. This alternate freezing and thawing of the plant stems and surrounding earth area causes splitting of the stems and heaving of the soil or earth around the plant with a consequent damage to the roots of the plant.

In order to protect plants such as rosebushes which are growing outside, many gardeners have used mounds of dirt around the base of the plants to reduce the thawing and freezing of the earth around the roots of the plants. This method, while it does protect the plant to some degree, is not the most satisfactory solution because of the manual labor and care necessary to accomplish the job. It is apparent that to mound dirt around the base or stem of each of the plants to be protected, it is necessary to move an appreciable weight of dirt at the time the plants are cared for in the fall season of the year and again when the mounds of dirt are removed in the spring season of the year. Also, in order to prevent abrupt shocks on the plant due to changing weather condtiions, it is generally necessary to remove the earth mound gradually in the spring season of the year. Thus, this whole procedure for protecting the outdoor plants is time-consuming and not always easy or convenient for some gardeners, particularly women or the older person.

Another disadvantage to the use of a dirt mound for protecting the plant lies in the fact that since the earth mound around the plant is generally frozen during the coldest season of the year, it is necessary that this entire mound thaw out before the plant growth can start. The best growing weather for plants, such as roses, is in the early spring, and often this early growing season is denied to the plant because the earth mound in the frozen state is still on the plant.

Therefore, it is an object of my invention to provide a plant protection device which can be placed over outdoor plants to protect these plants throughout the whole season of cold weather.

It is another object of my invention to provide such a device which is lightweight as well as rigid and which can be easily applied over the plants or stacked for storage in a relatively small space when not in use.

It is also an object of my invention to provide a plant protection device that can be readily secured in place while over the plants.

It is still another object of my invention to provide a removable cover for my plant protection device which is designed to provide varying degrees of ventilation to the plant within the protector dependent on the weather conditions existing around the plant.

It is a further object of my invention to construct my plant protection device of an opaque material so as to shield the plant from the sun's rays.

Other objects of my invention will become apparent in the description which follows.

In general, I provide a rigid box-like device of opaque material which is adapted to be placed over the plant to be protected during the cold months of the season, and this protector has outwardly directed flange portions adapted to support the protector on the ground. The preferred shaped of my protector is that of a truncated pyramid with a flat top surface. However, the protector may be of other shapes, such as a cone, or a cylinder, and these other shapes are considered within the scope of my invention. As will be described in more detail later, my invention includes a removable top cover for the device together with ventilation means for the interior of the plant protection device.

FIGURE 1 is a perspective view of the plant protection device constructed in accordance with my invention.

FIGURE 2 is a view, partially in cross-section, of another from of the device.

FIGURE 3 is a fragmental sectional view of a portion of the cover disposed in the top of the plant protection device as disclosed in FIGURE 1.

Referring now to FIGURE 1 of the drawings, the preferred form of my plant protection device is generally indicated at 10. As can be seen, the device 10 is in the form of a truncated pyramid with base flanges 11, and this device is adapted to be placed over an outdoor plant in a manner as shown in FIGURE 2 with the outwardly extending flanges resting on the ground surfaced 12. As indicated generally at 13, loose earth or dirt may be placed over and around these flanges to hold the device 10 in place over the plant which is to be protected. There are also holes 14 through flanges 11 at each corner of the device 10 so that the device can be staked in position if desired.

The side walls 15 extend upwardly and inwardly from flanges 11 and are joined by a top wall 16. A circular cover 17 fits into a mating cutout portion of the top wall 16 and can be removably positioned in the cutout portion in a manner to be described later. The central portion of the cover 17 is depressed at 18 to form a raised portion 19 which provides a convenient finger grip so that the cover 17 can be removably placed in the top wall 16 of the device 10, and likewise can be rotated while in mating position within top wall 16 to a plurality of positions.

At this point it is desirable to point out that my plant protection device 10 is made from an opaque material such as styrofoam, or any other suitable material, so that when the device is positioned over a plant, as in FIGURE 2, with the cover 17 in place in the top wall 16, the plant within the device 10 is shielded or shaded from outside light sources and particularly from the rays of the sun for reasons which will be pointed out later. Obviously, however, cover 17 can be removed from the plant protection device 10 so that light and heat rays from the sun can be admitted to the interior of the plant protection device 10 under certain conditions which will also be discussed later. If the cover 17 is removed from the device 10, then air can circulate to the interior of the device 10 through the cut-out portion of the top wall 16.

An important aspect in my invention lies in the means for controlling the ventilating air supply to the interior of the plant protection device during certain periods when the cover 17 is in place in the device. When the device is placed over the plant in the late fall, it is anticipated that the cover 17 can remain in place during the extreme cold months of the winter, and during this time the plant will be in darkness within the plant protection device. Because of the plant protection device 10, the plant is protected throughout the extremely cold months of the winter from the effects of mild days and the heat rays of the sun.

With the advent of the early spring season and somewhat warmer days, it is still desirable to keep the cover 17 in place in the device 10 so that the ground area around the plant base and the stems of the plant are not subject to alternate freezing and thawing conditions which might be occasioned by the warmer days and the cold nights, as well as the direct rays of the sun. However, at this time the interior of the plant protection device must be ventilated in some manner so that mildew will not form on the plant within the plant protection device 10. Consequently, in the preferred form of the plant protection device 10, as illustrated in FIGURES 1 and 3 of the drawings, I have provided an arrangement which acts as a light baffle to the direct rays of the sun and yet which permits an adjustable amount of air to be circulated to the interior of the plant protection device 10 even when the cover 17 is in place in the device.

As shown in FIGURES 1 and 3 of the drawings, I have provided spaced slot-like openings 20 which are cut out of the top wall 16 of the plant protection device 10, and it will be noted that these slot-like openings 20 do not extend completely through the top wall 16. Referring to FIGURE 3 of the drawings, it can be seen that the cut-out portion of the top wall 16 has an inwardly projecting peripheral ledge generally designated at 21 with a flat surface 22 and a vertical surface or wall 23. The bottom surface 24 of the cover 17 is adapted to rest on the flat surface 22 of the peripheral ledge 21 when cover 17 is received in the top wall 16. When so disposed, the peripheral edge 25 of the cover 17 fits snugly against the wall surface 23 of the peripheral ledge 21. It will be noted that, as shown in FIGURE 3, there is a slot 26 cut in the lower surface of the cover 17, and the slot 26 extends from the peripheral edge 25 to the bottom surface 24 of cover 17.

Referring again to FIGURE 1, it can be seen that the slot-like openings 20 are of appreciable length and extend along the peripheral surface of the cut-out portion for receiving the cover 17. The slots 26 in the lower surface of the cover 17 are of approximately the same length along the peripheral edge 25 of cover 17 as the length of the slot-like openings 20. As can be seen best in FIGURE 3, when the slot-like openings 20 are aligned with the slots 26, there is an opening extending through the slot-like opening 20 and through the slot 26 to permit air flow from the exterior of the device 10 to the interior of the device. However, because of the particular construction of the slots in the top wall 16 and the cover 17 of the device, and the arrangement of the peripheral ledge 21, direct rays of the sun do not enter the interior of the plant protection device 10.

The number of slot-like openings 20 and corresponding slots 26 in the top wall 16 and cover 17 of the device 10 can, of course, be varied in number and in peripheral length along the mating surfaces of the top wall 16 and cover 17. It should be apparent that by turning the cover 17 with the finger grip or raised portion 19, the slot-like openings 20 can be aligned with the slots 26, or cover 17 can be positioned so that there is no alignment between the slot-like openings 20 and slots 26 and there will be no passageway for air ventilation to the interior of the device 10. Furthermore, with the particular arrangement disclosed, it is possible to fully align the slot-like openings 20 and slots 26 for maximum air ventilation or to partially align these facing openings to the degree required for less than full ventilation.

In FIGURE 2 of the drawings, I have shown a second form of means for ventilating the interior of the plant protection device. The general shape of the plant protection device and associated cover are similar to that disclosed in FIGURES 1 and 3 of the drawings, and corresponding parts of the plant protection device have been designated with a primed number corresponding to that part of the device shown in FIGURES 1 and 3 of the drawings.

Looking, then, at FIGURE 2 of the drawings, it can be seen that a somewhat different arrangement has been provided at the mating peripheral surfaces between the top wall 16' and the cover 17' of this embodiment. As generally designated at 27, there is an inwardly extending ledge having a top surface 28 on which the bottom surface 24' of cover 17' is supported when cover 17' is received within the cut-out portion in the top wall 16'. Peripheral edge 25' fits snugly in mating relationship with a corresponding peripheral wall 29 in top wall 16'. No provision is made with this arrangement for any passage between the top wall 16' and the cover 17' to admit air for ventilation of the interior of the plant protection device 10'. As thus shown, the cover 17' can, of course, be removably positioned in the top wall 16'.

In order to provide ventilation for the interior of the device 10', I have provided a series of spaced slits 30 which extend through the walls of the plant protection device 10' at the junction of the side wall 15' and the top wall 16'. These slits 30 may be of a desired width and the number provided around the four sides of the device 10' can be varied to suit the circumstances. Obviously, with this type of ventilation as shown in FIGURE 2 of the drawings, no provision is made for cutting off the air ventilation to the interior of the device 10' or reducing the amount of air ventilation being provided through the openings which extend to the interior of device 10'.

From the above description it can be seen that I have provided a plant protection device whereby outdoor plants that need protection from severe winter weather can be quickly prepared for the winter season, and this device provides means for meeting the various changes in the weather situation throughout the entire length of the cold season. It is contemplated that the plant protection device will be used in the manner to be described below although such use will necessarily depend to some extent on the judgments of the individual gardeners and the geographical area of use.

As indicated above, the plant protection device can be placed over the plant in the late fall season and staked or retained in place by means of loose dirt over the flanges of the device. In the preferred form of my invention, the cover is in place at this time and is so disposed that there is no air ventilation between the cover and the top wall of the device. Thus, the plant is in darkness within the plant protection device and the cover will remain in place until the somewhat milder temperatures of early spring are encountered. At this time the cover 17 will be kept in place in the device but the ventilating passageways between the cover and the top of the device can be gradually opened to allow air ventilation to the interior of the device to prevent mildew on the plant.

As the days continue to grow warmer, but it can be expected that there will be cold nights, the cover 17 can be entirely removed from the device during the daytime hours and be replaced at night. Then, as the nights also become warm in the spring season, the cover 17 can be left off entirely hardening off the plant. As the weather becomes settled the plant protection device can be removed entirely from over the plant and the plant should be in full growth by this time. Thus, it is contemplated that plants being protected by my novel device will have as much as a 30 day head start in growth over plants not so protected.

The use of the other form of my plant protection device, shown in FIGURE 2 of the drawings, is similar to that described for the preferred form of the invention except, of course, that no provision is made in this other form of the invention for controlling the air ventilation to the interior of the device when the cover is in place.

What I claim is:

A plant protection device with enclosing rigid opaque wall and top portions designed to fit around an outdoor plant, outwardly directed flange portions at the lower extremities of the walls adapted to rest on the ground surface at appreciable distances from the stem of said plant, said top portion being substantially horizontal and having a substantially circular opening therein which is designed to removably receive a cover of opaque material, said cover being manually rotatable within said opening, said cover having a plurality of spaced openings therein which are adapted to be moved in and out of alignment with associated spaced openings in the top portion of the protector, the openings in said cover being slots which are disposed along the underside of said cover at the peripheral edge thereof and the spaced openings in the top portion are upwardly opening slots which extend downward only partially through the top portion of the device along the periphery of the circular opening therein, so that the interior of the device will not receive direct rays of the sun when the openings in said top portion and said cover are aligned to provide air ventilation to the interior of the device.

References Cited by the Examiner

UNITED STATES PATENTS

| | | | |
|---|---|---|---|
| 196,165 | 10/1877 | Pardessus | 47—29 |
| 757,045 | 4/1904 | Lane | 47—27 |
| 2,691,848 | 10/1954 | Arena | 47—26 |
| 2,904,933 | 9/1959 | King | 47 |
| 2,950,567 | 8/1960 | Newman. | |
| 3,093,930 | 6/1963 | Witkowski | 47—29 |

FOREIGN PATENTS

| | | |
|---|---|---|
| 22,989 | 6/1907 | Great Britain. |
| 666,714 | 2/1952 | Great Britain. |
| 91,450 | 4/1958 | Norway. |

ABRAHAM G. STONE, *Primary Examiner.*